Figure 1:
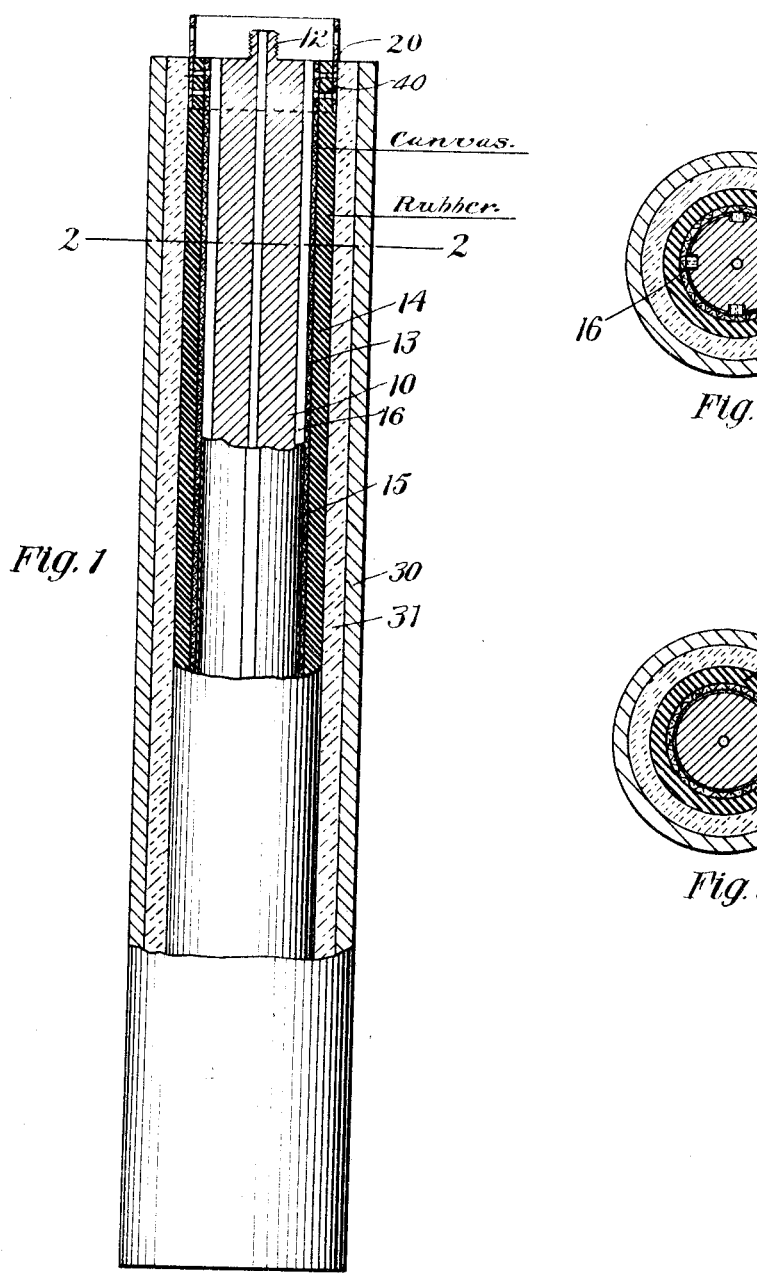

G. W. PRIEST.
CORE FOR THE MANUFACTURE OF CEMENT AND CEMENT LINED PIPES.
APPLICATION FILED NOV. 8, 1911.

1,076,229.

Patented Oct. 21, 1913.

Witnesses:
H. B. Davis
J. L. O'Neill

Inventor:
George W. Priest
by Mayo & Harriman
Atty.

UNITED STATES PATENT OFFICE.

GEORGE W. PRIEST, OF NEWTON, MASSACHUSETTS.

CORE FOR THE MANUFACTURE OF CEMENT AND CEMENT-LINED PIPES.

1,076,229.

Specification of Letters Patent.

Patented Oct. 21, 1913.

Application filed November 8, 1911. Serial No. 659,091.

*To all whom it may concern:*

Be it known that I, GEORGE W. PRIEST, a citizen of the United States, residing at Newton, in the county of Middlesex and State of Massachusetts, have invented an Improvement in Cores for the Manufacture of Cement and Cement-Lined Pipes, of which the following is a specification.

In the manufacture of cement and cement-lined pipes, cores of various kinds have been employed, and this invention has for its object the construction of an improved core that may be withdrawn from the pipe after the cement has hardened without liability of cracking or otherwise injuring the cement surface.

The invention involves essentially a tubular covering arranged on a core-piece, said covering having yielding qualities whereby it may be compressed by the cement incident to the hardening thereof, and also having the capability of not adhering to the cement or to the core-piece. My improved covering while still engaging the cement permits the core-piece to be withdrawn from it, after which it is withdrawn from the cement or cement lined pipe, or if desired both the core-piece and covering may be withdrawn from the pipe at the same time.

Rubber, has heretofore been employed as a core or as a component part of a core, it being well suited for the purpose for the reason that it is not affected by the alkali contained in the cement. But, when used alone or in a form adapted to be distended by a gas, it is not sufficiently rigid to withstand the pressure put upon it, and as a result the inner surface of the pipe is not truly formed; and when used as a covering on an iron core the sulfur in the rubber combines with certain ingredients in the iron and a chemical action is set up which seriously injures the rubber, and also the cement; and furthermore, when used as a covering for a core-piece it is practically impossible to withdraw the core-piece by reason of the frictional engagement one with the other, unless the core-piece is collapsible.

In my present invention the tubular covering is composed of two parts, an inner part and an outer part, the inner part being especially designed for engagement with the core-piece, and to permit easy withdrawal of the core-piece, and to prevent chemical action being set up between the rubber of the outer part and the core-piece, and the outer part being especially designed for engagement with the cement. Said inner and outer parts, however, are intimately connected together, so as to form a single piece tubular covering. The inner part may be composed of canvas, or essentially of canvas, which will not adhere to the core-piece, particularly, if wax or French chalk is used as a lubricant between them, and the outer part may be composed of rubber or essentially of rubber, and made quite thick so as to yield sufficiently to accommodate the expansion of the cement, when hardening, and said canvas and rubber are intimately secured together in any well-known manner.

Figure 2:
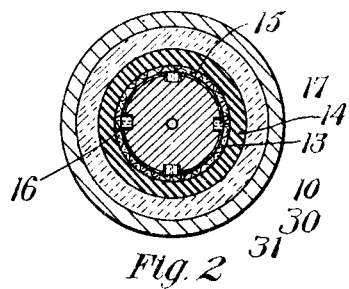
Figure 3:
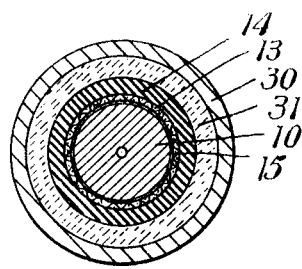

Figure 1 is a front elevation and partial vertical section of a core for the manufacture of cement and cement-lined pipe, it being represented as arranged in a cement-lined pipe of ordinary construction. Fig. 2 is a transverse section of the core taken on the dotted line 2—2 Fig. 1. Fig. 3 is a transverse section of a modified form of core.

Referring to the drawings, the core-piece 10 is here represented as a solid cylindrical bar, but so far as my invention is concerned, the construction of the core-piece is immaterial, although it is preferably provided with a screw-threaded nipple 12 to receive a suitable device for removing it. A new and improved form of outer covering is arranged on the core-piece, which comprises a tubular inner part 13 and a tubular outer part 14. The inner part is composed of canvas, or essentially of canvas, or equivalent material, whereby it will not adhere to the core-piece, although it may be interiorly coated with wax or French chalk, or some equivalent material, if desired, as indicated at 15. The outer part is composed of rubber, or essentially of rubber, whereby it will yield sufficiently to accommodate the expansion of the cement when hardening, and will not adhere to the cement, or either act to injure the other. Said inner and outer parts are intimately connected together by and during the process of vulcanization of the rubber, while contained in a suitable mold, or in any well-known manner understood by rubber workers.

The core-piece 10 may have longitudinal grooves formed in its outer surface extended from end to end of it, as at 16, and strips of wood, or their equivalents, such as metallic rods 17 are adapted to enter said grooves, said strips being secured to the inner face of the inner part 13 of the covering, to act as a stiffener therefor, and to facilitate withdrawal of the covering, but such strips are not particularly important, as the covering may be made without them, as shown in Fig. 3, and in such case, the core-piece 10 will be devoid of grooves.

A metallic ring 20 is arranged on the outside of the covering at its upper end which extends beyond the end of the covering and is attached thereto by rivets 40 extended through the covering, and after the corepiece has been withdrawn the upper end of the cover may be grasped by the hand or by a suitable tool for the purpose of withdrawing the cover from the pipe.

The canvas layer 13 prevents the sulfur in the rubber from combining with the ingredients contained in the core-piece, and setting up a chemical action, which is injurious to the rubber and to the cement also, thus enabling the employment of an iron core-piece. Said layer is also non-extensible, and thereby gives to the covering sufficient strength to enable it to be withdrawn from the pipe, by pulling upon it with considerable force. In practising my invention the core is arranged in the pipe 30, and the cement 31 is arranged in the pipe about the core after which the cement is allowed to harden, and when the cement has hardened sufficiently to admit of the removal of the core, the core-piece 10 is usually withdrawn first and then the tubular covering.

I claim:—

1. A core for cement and cement-lined pipes consisting of a rigid core-piece and a tubular open-ended covering thereon, said covering comprising a non-extensible inner tube to engage the core-piece and a yielding outer tube of substantial thickness to engage the cement and to be compressed by the cement on hardening and also permitting withdrawal of the component parts of the core, said inner and outer tubes being secured together over all to form a single-piece tubular covering, substantially as described.

2. A core for cement and cement-lined pipes consisting of a rigid core-piece having longitudinal grooves to receive strips on the covering, and a tubular open-ended cover thereon, said covering comprising an inner tube and a yielding outer tube intimately associated together throughout their length, said inner tube having rigid strips arranged on its inner side to enter the groove in the core-piece, substantially as described.

In testimony whereof, I have signed my name to this specification, in the presence of two subscribing witnesses.

GEORGE W. PRIEST.

Witnesses:
B. J. NOYES,
H. B. DAVIS.